Patented Dec. 1, 1953

2,661,299

UNITED STATES PATENT OFFICE 2,661,299

PROCESS OF MAKING PIGMENTED SPINNING SOLUTION

Harry Paul and John T. Watts, Coventry, England, assignors to Courtaulds Limited, London, England, a British company No Drawing. Application November 23, 1949, Serial No. 129,186

Claims priority, application Great Britain January 10, 1949

7 Claims. (Cl. 106—198)

This invention relates to the production of pigmented solutions of cellulose esters or ethers such as for example pigmented cellulose acetate solutions for the production of pigmented cellulose acetate threads.

Hitherto, it has been the practice commercially to produce pigmented cellulose acetate solutions, for example cellulose acetate solutions containing titanium dioxide, by grinding together the pigment, the cellulose acetate and a solvent for the cellulose acetate, usually acetone. The dry titanium dioxide as sold for use as a pigment is usually in a very fine state of subdivision obtained by prolonged grinding. However when such finely-divided material is treated with acetone or other solvent in accordance with usual practice, the pigment particles tend to form aggregates and it is therefore usual to subject the titanium oxide-cellulose acetate-solvent mixture to a further grinding operation in order to break down the aggregates. United States Patent specification No. 2,059,083 describes a method of pigmenting cellulose ester solutions by grinding a dry pigment with a small proportion of dry cellulose ester and incorporating the resulting mixture into the cellulose ester solution to be pigmented; in the examples, the dry pigment and dry cellulose acetate are ball-milled for 48 hours and for 72 hours in order to produce satisfactory pigmented solutions.

Proposals have also been made for producing pigmented cellulose ester or ether solutions without the need for grinding treatments. In United States patent specification No. 1,795,764 it is proposed to make pigmented soluble cellulose esters and ethers in fibrous form by precipitating the pigment in finely divided form directly on to the cellulose derivative; the pigmented cellulose derivative may be dissolved in a suitable solvent for making lacquers. British patent specification No. 350,924 describes a process for the pigmentation of cellulose esters and ethers in which the cellulose derivative and the pigment, both in a finely-divided state, are mixed or simply stirred together in a liquid medium comprising a solvent for the cellulose derivative with substantially an equal volume of water, so that the cellulose derivative fixes the pigment and, after being separated, washed and dried, may be readily dissolved in the desired organic solvent. British patent specification No. 376,989 describes a process for the preparation of pigmented bases of cellulose derivatives such as nitrocellulose and cellulose acetate for the production of lacquers and the like, in which a dispersion of the pigment is effected by prolonged kneading of a non-aqueous mixture consisting of a relatively large quantity of the pigment, a relatively small quantity of a fibrous cellulose derivative and a solvent for the latter, the viscosity of the mixture being such that the pigment particles are broken down by attrition and re-agglomeration of the pigment during the kneading is prevented. United States patent specification No. 2,048,243 describes a process of making textile yarns in which the spinning solution is prepared by working a plastic mass comprising a cellulose derivative and a solvent or softener, and a pigment between rolls until the plastic mass is brought to a substantially dry state and the particle size of the pigment is reduced, and dispersing the resulting product in the spinning solution containing the same cellulose derivative.

It is the object of the present invention to provide an improved and more economic process for the production of pigmented solutions of cellulose esters and ethers in which grinding of the pigment in the presence of the cellulose derivative is avoided.

In accordance with the present invention, a process for the production of a pigmented solution of a cellulose ester or ether comprises the steps of mixing a substantially dry powdered cellulose ester or ether and a dry pigment in the state of subdivision desired in the solution in a proportion not exceeding 12 per cent by weight, based on the weight of the cellulose ester or ether, until the pigment is substantially uniformly distributed over the surfaces of the cellulose ester or ether powder, and then stirring the dry mixture so obtained with a solvent for the cellulose ester or ether until the latter has dissolved in the solvent to produce a pigmented solution.

Air dry cellulose esters and ethers normally contain a small amount of occluded moisture usually of the order of 3 per cent, and in carrying out the present invention, it is not necessary to remove this small amount of moisture. The cellulose ester or ether may be used in the bone dry state if desired but there is no advantage in removing the occluded moisture.

The mixing of the dry cellulose ester or ether powder and the pigment may be effected in any suitable mixing machine in which adequate mixing of the particles is effected, such as for example a rotating drum, a tumbling machine or, preferably a Werner-Pfleiderer machine. The time required to obtain the desired mixing will depend to some extent on the type of machine used;

with a Werner-Pfleiderer machine, about 1 to 2 hours' mixing is usually sufficient.

The dissolution of the cellulose ester or ether may be readily effected by stirring the dry powdered mixture together with the amount of solvent necessary to give the required concentration in a tank or other suitable vessel; the dissolution is preferably effected in the mixing machine in which the dry powders are mixed. It is preferred to add the solvent in two or more stages so that in the first stage the powdered mixture and the amount of solvent used are sufficient to form a dough which is thereafter diluted by adding and mixing in further quantities of the solvent until the desired concentration is reached.

The process according to the invention may be employed to form a pigmented solution which can be spun directly into filaments, or alternatively a more concentrated pigmented solution may be prepared which is suitable for incorporation as a stock pigmented solution in spinning solutions prepared by the usual procedure. For preparing a spinning solution directly, a small concentration of pigment, preferably of the order of 1 to 3 per cent, is usually employed whereas for making stock pigmented solutions the concentration of pigment used should be higher, preferably within the range of 9 to 12 per cent.

When carrying out the process according to the invention it is found that when the cellulose ester or ether particles which are uniformly coated with the pigment are mixed in with the solvent, the pigment particles have little or no tendency to form aggregates; microscopic examination of the pigmented solutions obtained shows that the solutions are remarkably free from aggregates. It is important that the amount of pigment used should not exceed 12 per cent since with concentrations above this figure, the pigment begins to show a tendency to form aggregates.

The preferred pigment for use in the present invention is titanium dioxide, but other inorganic or organic pigments or mixtures of such pigments may be used. Examples of such other pigments are:

Carbon black,
Monastral Fast Blue BS (Journal of the Society of Dyers and Colourists, 1943, page 233);
Monolite Fast Yellow GNS (Journal of the Society of Dyers and Colourists 1943, page 223);
Irgalite Green DBN (The Geigy Company Limited);
Irgalite Red CBN (The Geigy Company Limited);
Irgalite Blue KR powder (The Geigy Company Limited).

For use in pigmenting cellulose acetate and like solutions, the pigments should have a particle size not greater than 5 microns (a micron being a thousandth of a millimetre) and preferably not greater than 1 micron.

The cellulose ester used is preferably cellulose acetate but other esters such as cellulose propionate, cellulose butyrate and cellulose acetate-butyrate may be used. Examples of cellulose ethers which may be used are ethyl cellulose and benzyl cellulose. In carrying out the process according to the invention, it is not necessary to reduce the cellulose derivative to a fine state of subdivision; the normal cellulose acetate flake may be used directly.

The invention is illustrated by the following examples in which the parts are by weight:

*Example 1*

3 parts of titanium dioxide and 103 parts of 20 to 30 mesh secondary cellulose acetate (containing 3 per cent moisture and having an acetyl content, calculated as acetic acid, of 54.0 per cent) were mixed together for 1 hour in a Werner-Pfleiderer machine. 145 parts of acetone were then added and the mixing continued for 2½ hours. A further 141 parts of acetone and 11 parts of water were then added and mixed for ½ hour. The solution obtained was then dry spun in the normal manner to produce pigmented threads.

*Example 2*

9 parts of titanium dioxide and 103 parts of cellulose acetate flake (containing 3 per cent moisture and having an acetyl content, calculated as acetic acid, of 54.0 per cent) were mixed together for 1 hour in a Werner-Pfleiderer machine. 145 parts of acetone were added and mixing was continued for 4 hours. 141 parts of acetone and 11 parts of water were then added and mixed for 1 hour. The resultant solution was used as a stock solution for making spinning solutions containing the desired concentration (usually 2 to 3 per cent) of titanium dioxide for dulling.

*Example 3*

1 part of Irgalite Green DBN and 103 parts of cellulose acetate as used in Example 1 were mixed together in a Werner-Pfleiderer machine for 2 hours. 140 parts of acetone and 5 parts of water were then added and mixed in the same machine for 5 hours. A further 140 parts of acetone and 5 parts of water were then added over a period of 1 hour after which mixing was continued for a further 2 hours. A solution suitable for dry spinning was obtained.

*Example 4*

3 parts of titanium oxide and 103 parts of cellulose acetate as used in Example 1 were mixed together for 1 hour in a Werner-Pfleiderer machine. 290 parts of acetone and 11 parts of water were then added and mixing continued for 3 hours. A solution suitable for dry spinning was obtained.

What we claim is:

1. In a process for the production of a pigmented spinning solution of a cellulose derivative, the steps of agitating without grinding a substantially dry powdered cellulose derivative chosen from the group consisting of cellulose esters and cellulose ethers with a dry pigment having a particle size not greater than 5 microns in a proportion not exceeding 12 per cent by weight of the cellulose derivative, until the pigment particles having substantially their original size are substantially uniformly distributed over the surfaces of the cellulose derivative particles, and then adding to the dry mixture so obtained a solvent for the cellulose derivative and stirring until the cellulose derivative has dissolved in the solvent, whereby the necessity for grinding after the addition of the pigment to the cellulose derivative is avoided and a pigmented spinning solution is produced which has the pigment particles suspended in it in substantially their original size and which is substantially free from aggregates of pigment.

2. A process as claimed in claim 1 wherein the cellulose derivative is used in the air dry condition.

3. A process as claimed in claim 1 wherein the solvent is added in at least two stages.

4. In a process for the production of a pigmented spinning solution of a cellulose acetate, the steps of agitating without grinding substantially dry powdered cellulose acetate with a dry pigment having a particle size not greater than five microns in a proportion not exceeding twelve per cent by weight of the cellulose acetate until the pigment particles having substantially their original size are substantially uniformly distributed over the surface of the cellulose acetate particles and then adding to the dry mixture so obtained, a solvent for the cellulose acetate, and stirring until the cellulose acetate has dissolved in the solvent, whereby the necessity for grinding after the addition of the pigment to the cellulose acetate is avoided and a pigmented spinning solution is produced which has the pigment particles suspended in it in substantially their original size and which is substantially free from aggregates of pigment.

5. A process as claimed in claim 4 wherein the pigment used is titanium dioxide.

6. A process as claimed in claim 4 wherein the solvent is added in at least two stages.

7. In a process for the production of a pigmented spinning solution of a cellulose derivative, the steps of agitating solely by tumbling, a substantially dry powdered cellulose derivative chosen from the group consisting of cellulose esters, and cellulose ethers with a dry pigment having a particle size not greater than 5 microns in a proportion not exceeding 12 per cent by weight of the cellulose derivative until the pigment particles having substantially their original size are substantially uniformly distributed over the surfaces of the cellulose derivative particles and then adding to the dry mixture so obtained, a solvent for the cellulose derivative, and stirring until the cellulose derivative is dissolved in the solvent, whereby the necessity for grinding after the addition of the pigment to the cellulose derivative is avoided and a pigmented spinning solution is produced which has the pigment particles suspended in it in substantially their original size and which is substantially free from aggregates of pigment.

H. PAUL.
J. T. WATTS.

References Cited in the file of this patent

UNITED STATES PATENTS

| Number | Name | Date |
|---|---|---|
| 1,568,995 | Buchholz | Jan. 12, 1926 |
| 2,059,088 | Childs | Oct. 27, 1936 |
| 2,109,592 | Macht | Mar. 1, 1938 |